(12) United States Patent
Falahee (10) Patent No.: US 9,914,507 B2
(45) Date of Patent: Mar. 13, 2018

(54) EXTENDABLE TABLE PLATFORM ASSEMBLY FOR MULTIHULL BOATS

(71) Applicant: Michael Falahee, South Lyon, MI (US)

(72) Inventor: Michael Falahee, South Lyon, MI (US)

( * ) Notice: Subject to any disclaimer, the term of this patent is extended or adjusted under 35 U.S.C. 154(b) by 0 days.

(21) Appl. No.: 15/066,840

(22) Filed: Mar. 10, 2016

(65) Prior Publication Data

US 2017/0259888 A1    Sep. 14, 2017

(51) Int. Cl.
| | |
|---|---|
| *A47B 85/00* | (2006.01) |
| *B63B 29/04* | (2006.01) |
| *A47B 1/10* | (2006.01) |
| *A47B 13/16* | (2006.01) |
| *A47B 13/08* | (2006.01) |
| *A47B 21/06* | (2006.01) |
| *H02J 7/00* | (2006.01) |
| *H02J 7/35* | (2006.01) |
| *F21V 33/00* | (2006.01) |
| *F21W 131/301* | (2006.01) |

(52) U.S. Cl.
CPC ............... *B63B 29/04* (2013.01); *A47B 1/10* (2013.01); *A47B 13/081* (2013.01); *A47B 13/083* (2013.01); *A47B 13/16* (2013.01); *A47B 21/06* (2013.01); *F21V 33/0012* (2013.01); *H02J 7/0045* (2013.01); *H02J 7/355* (2013.01); *A47B 2021/066* (2013.01); *B63B 2029/046* (2013.01); *F21W 2131/301* (2013.01)

(58) Field of Classification Search
CPC ....... A47B 31/06; A47B 23/041; A47B 13/16; A47B 2200/03; A47B 2200/008; B63B 35/34; B60N 3/04; B60N 3/041
USPC ...... 108/44, 45, 25, 23, 50.01; 114/292, 362
See application file for complete search history.

(56) References Cited

U.S. PATENT DOCUMENTS

| | | | | |
|---|---|---|---|---|
| 2,451,275 | A * | 10/1948 | Cercownay | B60N 3/001 108/34 |
| 2,471,730 | A * | 5/1949 | Doerr | B60N 3/001 108/33 |
| 4,915,437 | A * | 4/1990 | Cherry | B60R 11/06 108/44 |
| 4,971,315 | A * | 11/1990 | Rector | A63B 5/10 114/343 |
| 5,085,164 | A * | 2/1992 | Whitton | B63B 27/14 114/362 |
| 5,085,165 | A * | 2/1992 | Reed | B63B 27/14 114/362 |

(Continued)

*Primary Examiner* — Jose V Chen
(74) *Attorney, Agent, or Firm* — Fishman Stewart PLLC (57) ABSTRACT

An extendable table platform assembly for use with a multihull boat is disclosed. The platform assembly includes a pair of opposing guide channels to be mounted on the underside of the horizontal deck of the multi-hull boat. A rigid elongated platform is including having a platform surface supported by a structural platform frame positioned along the platform surface perimeter. The rigid elongated platform includes a table portion and a cantilever portion. The structural platform frame engages the guide channels such that the rigid elongated table section may be manually slid from a stowed position, underneath the deck, to a deployed position exposing the table portion. The cantilever portion remains underneath the horizontal deck and engaged to the opposing guide channels to support the table portion in the deployed position.

15 Claims, 7 Drawing Sheets

(56) References Cited

U.S. PATENT DOCUMENTS

| | | | | |
|---|---|---|---|---|
| 5,370,060 A * | 12/1994 | Wang | B60N 3/004 | 108/149 |
| 5,813,354 A * | 9/1998 | Scott | B60N 3/004 | 108/44 |
| 6,679,188 B1 * | 1/2004 | Spagnoli, Jr. | B60N 3/004 | 108/152 |
| 6,758,518 B2 * | 7/2004 | Ingram | B60N 3/004 | 108/44 |
| 6,889,618 B1 * | 5/2005 | Gromack | A47B 13/088 | 108/151 |
| 6,997,111 B2 * | 2/2006 | Giegerich | A47B 3/002 | 108/115 |
| 7,028,632 B2 * | 4/2006 | Blank | B63B 27/143 | 114/362 |
| 7,628,439 B1 * | 12/2009 | Strong | B62D 33/0273 | 108/44 |
| 8,056,496 B1 * | 11/2011 | Bussa | B63B 27/146 | 114/362 |
| 8,276,523 B2 * | 10/2012 | Miller | A47B 21/00 | 108/50.02 |
| 8,327,774 B1 * | 12/2012 | Rivera | B60N 3/005 | 108/44 |
| 9,340,258 B1 * | 5/2016 | Long | B63B 17/00 | |
| 2009/0044729 A1 * | 2/2009 | Navarre | B60P 1/43 | 108/44 |
| 2014/0165893 A1 * | 6/2014 | O'Neal | B63B 35/613 | 114/61.15 |

\* cited by examiner

FIG. 13

EXTENDABLE TABLE PLATFORM ASSEMBLY FOR MULTIHULL BOATS

BACKGROUND

Multihull boats, such as pontoon boats, are popular marine vehicles for entertaining. Their stable and generally flat deck provides a base for comfortable seating and entertainment that is not often found in boats of comparable size. Their low draft allows them access to waterways that would be otherwise inaccessible to traditional hull boats. The low draft also allows them to pull directly up to beaches and sandbars. It is common, therefore, for users to navigate to landing areas to picnic or relax in the shallow waters.

Approaches to modifying these boats often revolve around ingress and egress to the deck. Since the deck resides on top of the pontoons, it may sit significantly above both the waterline and any standing surface in the shallows. As such, modifications have been developed to add swim platforms, gangplanks and diving boards. These modifications require components and mounting structures capable of supporting the body weight of users. Additionally, they are often designed to deliver a body weight bearing surface that transitions from the waterline to the deck.

These designs do not address the needs of individuals who are not looking for ingress or egress of the multihull boat, but are looking for convenience and accessibility while the boat is beached or near a sandbar. In these scenarios, many find it desirable to spend time outside the boat either on the beach or in the shallows. However, during this time they may also desire access to the comforts and accessibility of food and beverages as they have while on the boat.

It may be desirable for boaters to have access to an extendable table that could be extended from a position stowed below the deck of the multihull boat. This would provide them with a picnic/dinner table at any beach or shallow location of their choosing. It would also be desirable for boaters to have access to many of the conveniences located on the boat without having to climb on and off the elevated deck.

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

An extendable table assembly for mounting to the underside of the deck of a multihull boat is disclosed with the capability to be installed on either new boats or pre-existing boats. Moreover, the extendable table assembly provides a convenient deployable surface for the retention of dishware, food, beverages, coolers, etc. for use by boaters while on the beach or in the shallows. Additionally, the extendable table assembly provides access to entertainment, games, storage, and electrical power for further utility and enjoyment.

Figure 1:
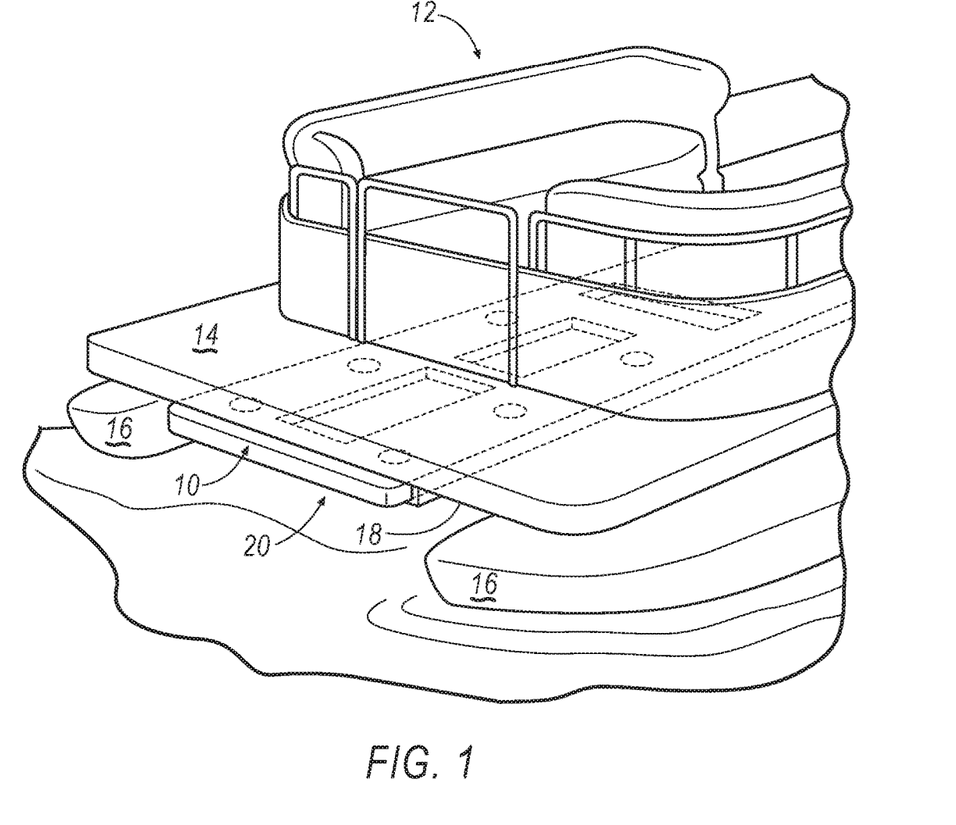
FIG. 1 is an exemplary illustration of an extendable table platform assembly mounted to a multi-hull boat and in a stowed position.

Referring now to FIG. 1, which is an exemplary illustration of an extendable table assembly 10 in accordance with the present invention. The extendable table assembly 10 is shown mounted to a multihull boat 12 having a horizontal deck 14 supported on either side by floatation elements 16 such as pontoons. It should be understood, that the multihull boat 12 depicted is for illustrative purposes only. It is contemplated that the present invention could be mounted to any suitable boat having a substantially horizontal deck 14 with proper clearance underneath. The extendable table assembly 10 is illustrated mounted to the underside 18 of the horizontal deck 14 and is depicted in the stowed position 20. In the stowed position 20 it is contemplated that the extendable table assembly 10 may be positioned such that virtually the entire assembly is below the horizontal deck 14 so as not to alter or impede the normal functioning or usage of the multihull boat 12.

Figure 2:
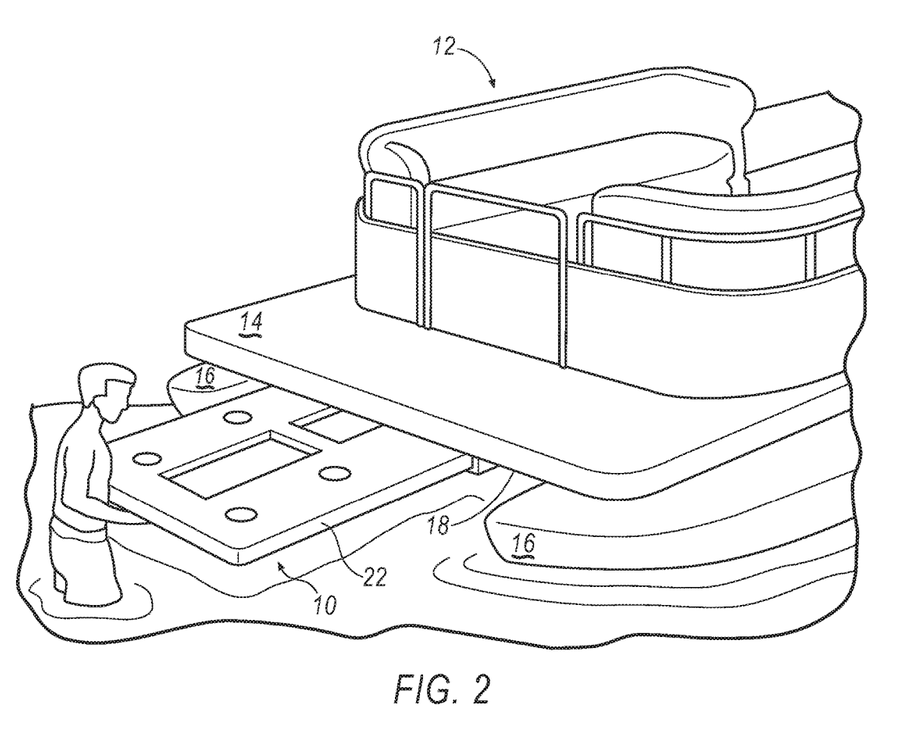
FIG. 2 is an exemplary illustration of the extendable table platform assembly of FIG. 1 being moved from the stowed position into the deployed position.

Referring now to FIG. 2, which is an illustration of the exemplary extendable table assembly 10 shown in FIG. 1. The extendable table assembly 10 includes a rigid elongated platform 22 that is slidably engaged to the underside 18 of the horizontal deck 14. When the boat 12 is in shallow water, such as near a beach or sandbar, a boater may pull on the rigid elongated platform 22 to extend it forward away from the bow of the boat 12. It is contemplated that the rigid elongated platform 22 is lightweight and rigid such that it may be easily moved with little effort and does not require mechanical assistance. This allows for the use of simple sliding engagements without the need for complex and costly bearings or rollers. It is further contemplated that the rigid elongated platform 22 remains substantially in plane as it moves so as to maintain a level eating surface. At its fully deployed position 24, see FIG. 3, the rigid elongated platform 22 exposes a table portion 26 to facilitate the placement and retention of food, supplies, and dishware. The term dishware is intended to include any item for the storage or distribution of food or beverages. This includes, but is not limited to, plates, bottles, glasses, silverware, napkins, platters and coolers. A plurality of recesses 28 may be formed in the upper platform surface 30 and may be shaped and sized to retain a wide variety of picnic related items.

Figure 3:
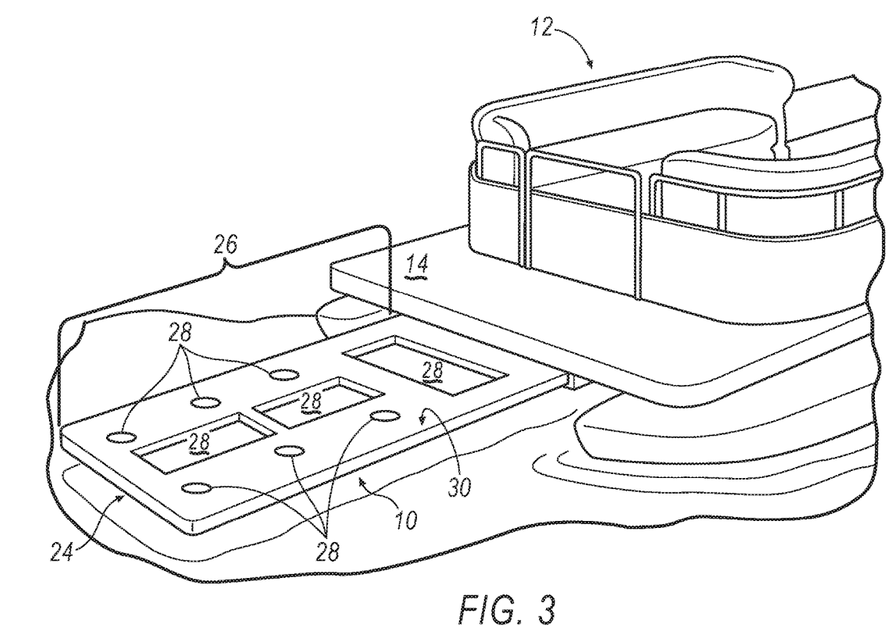
FIG. 3 is an exemplary illustration of the extendable table platform assembly of FIG. 1 in the deployed position.
Figure 4:
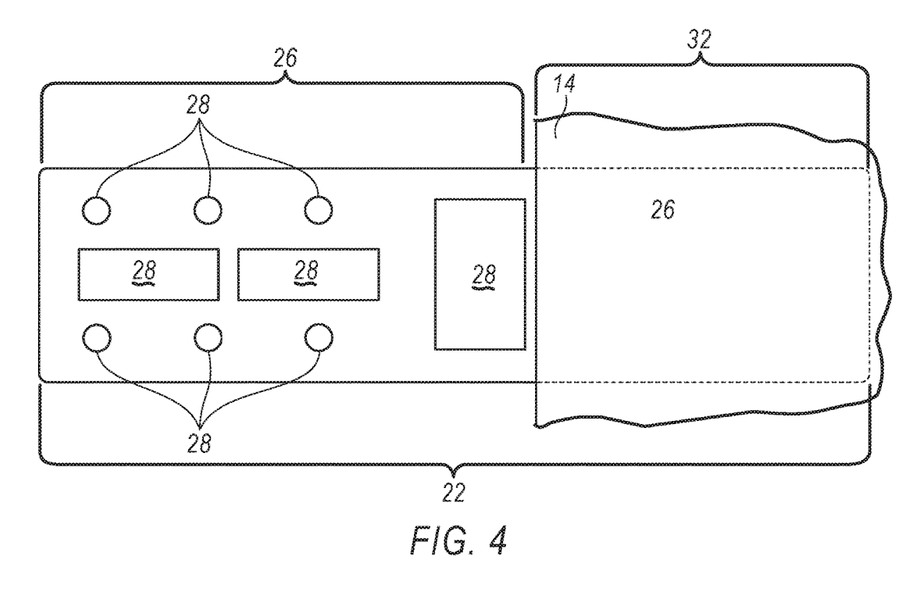
FIG. 4 is an exemplary top view illustration of the extendable table platform assembly of FIG. 3.

Referring now to FIGS. 3 and 4, the rigid elongated platform 22 is comprised of a solid and rigid unit that includes the table portion 26 and a cantilever portion 32. When in the deployed position 24, the table portion 26 extends forward of the horizontal deck 14 while the cantilever portion 32 remains slidably secured to the horizontal deck 14. The cantilever portion 32 provides cantilever support for the table portion 26 when in the deployed position 24. This allows the table portion 26 to remain rigidly horizontal and in plane, while providing no access restrictions to boaters around its perimeter. The rigid elongated platform 22 is preferably light and rigid such that multiple items may be placed within the recesses 28 or on the upper platform surface 30 without resulting in substantial deflection.

Figure 5:
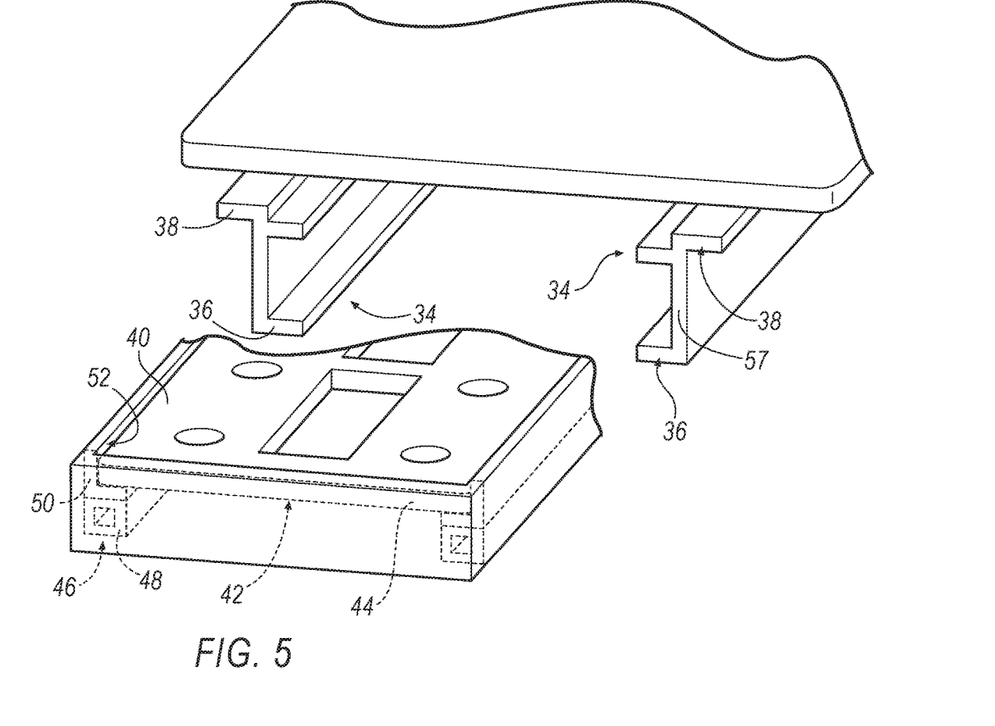
FIG. 5 is an exemplary exploded view illustration of the extended platform assembly.

Referring now to FIG. 5, which is an exemplary exploded view illustration of an extended table assembly 10. The extended table assembly 10 may include a pair of opposing guide channels 34 configured to be mounted on the underside 18 of the horizontal deck 14. It is contemplated that each of the opposing guide channels 34 may be comprised of extruded aluminum forming a c-channel 36 and a mounting flange 38. The mounting flange 38 may be attached to any available mounting structure existing on the horizontal deck 14. Installation may be as simple as aligning the opposing guide channels 34 and drilling through the mounting flange 38 and into the structure of the horizontal deck 14. This allows the opposing guide channels 34 to be mounted to virtually any existing boat by bolting the channels 34 to existing structure in any structurally adequate location.

The rigid elongated platform 22 may be comprised of a platform surface 40. The platform surface 40 has the upper platform surface 30, a lower platform surface 42 and a platform perimeter 44. The platform surface 40 may be a light weight material. In at least one exemplary example it is contemplated that the platform surface 40 is comprised of a non-body-weight bearing material. This is understood, for the purposes of this invention to be a material insufficient to maintain an adult's body weight. Although a variety of materials are contemplated, one exemplary example contemplates the use of a polymer material. In another exemplary example, it is contemplated that an aluminum mesh surface may be utilized. The platform surface 40 may be supported by way of a structural platform frame 46 that follows the platform perimeter 44. The structural platform frame 46 may be configured to engage the opposing guide channels 34 to allow the rigid elongated platform 22 to be slide between the stowed position 20 and the deployed position 24 through simple contact engagement. When in the deployed position 24, the table portion 26 extends forward of the horizontal deck 14, as discussed, while the structural platform frame 46 surrounding the cantilever portion 32 remains within the opposing guide channels 34 to provide cantilever support.

In the exemplary illustration, the structural platform frame 46 may be comprised of a rectangular tubular portion 48 and an angle portion 50. The angle portion 50 may be affixed onto the top of the rectangular tubular portion 48 by welding or other attachment methodology. Alternatively, they may be formed as a unitary construction. The platform surface 40 is affixed to the rectangular tubular portion 48 or the angle portion 50 by way of any appropriate attachment methodology such as an adhesive, in the case of a polymer, or by welding, in the case of a mesh aluminum grill. In the exemplary illustration, the angle portion 50 may include a ridge portion 52 that protrudes above the upper platform surface 30. This is beneficial for preventing items from sliding off the upper platform surface 30 while on the water. Although a variety of sizes for the platform surface 40 are contemplated, in one exemplary example the platform surface 40 is contemplated to be approximately 2' wide by 8' long and ¾" thick (thickness when utilizing a polymer material). Similar dimensions of width and length may be used for an aluminum mesh while the thickness would be the thickness of the aluminum. In this exemplary example, it is contemplated that the cantilever section 32 would be approximately 2' of the total 8' length or approximately ¼ of the total length.

Figure 6:
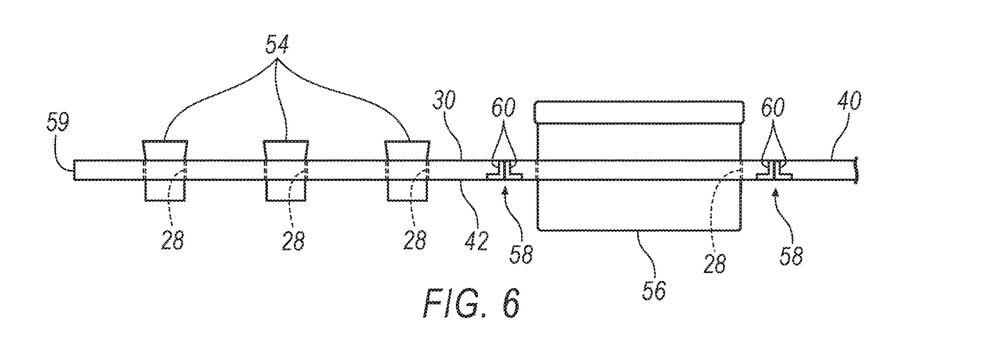
FIG. 6 is a detailed illustration of an exemplary example of cut-through recesses for use in any of the configurations depicted in the previous Figures.

Reference is now made to FIGS. 5 and 6 with FIG. 6 being an exemplary illustration of configuration of one or more of the plurality of recesses 28. Although it is contemplated that the plurality of recess may comprise only partial recesses into the upper platform surface 30, in this exemplary example one or more of the recesses 28 may comprise cut-through recesses that pass entirely through the platform surface 40. This has the advantage of further lightening the weight of the rigid elongated platform 22. It also allows tableware, such as the exemplary illustrated cups 54 and cooler 56 to protrude past the lower platform surface 42. This allows larger sized items to be placed within the recesses 28 while not interfering with the horizontal deck 14 when in the stowed position 20. Additionally, at least one of the recesses 28 may comprise a large and/or heavy item recess in the sense that the cross-sectional area is greater than that of another recess 28. For example, the recess receiving cooler 56 is larger than the recess receiving a cup 54 in FIG. 6. It is contemplated that cross-braces 58 spanning across opposite sides of the structural platform frame 46 may be positioned on either side of the large and/or heavy item recess to allow placing items whose weight might exceed the limit of the platform surface 40. In the exemplary illustration shown, the cross-braces 58 are shown as angle iron table top dividers 60 that protrude up through the upper platform surface 30. This provides additional structural rigidity and provides support for increased weight in the surrounding recesses 28. It should be understood, however, that a wide variety of cross-bracing sizes, structures and shapes may be implemented in light of the present disclosure. Additionally, in the illustrated example, larger recesses 28 configured to receive heavier items such as coolers 56 are shown positioned in close proximity to an edge 57 of channels 36 when platform 22 is in the deployed position 24. It may be less desirable to have this weight positioned in close proximity to or adjacent to a free end 59 of platform 22 where the weight of such heavier items may impede the selective movement of platform 22 into and out of the underside 18 of the horizontal deck 14 while being utilized because of the greater torque applied when the length is longer for a given weight with respect to a pivot axis defined at least in part by the outer edge 57 of channel 36. In practice, however, locations of recesses 28 and what they receive will depend on specific utilizations and circumstances.

Figure 7:
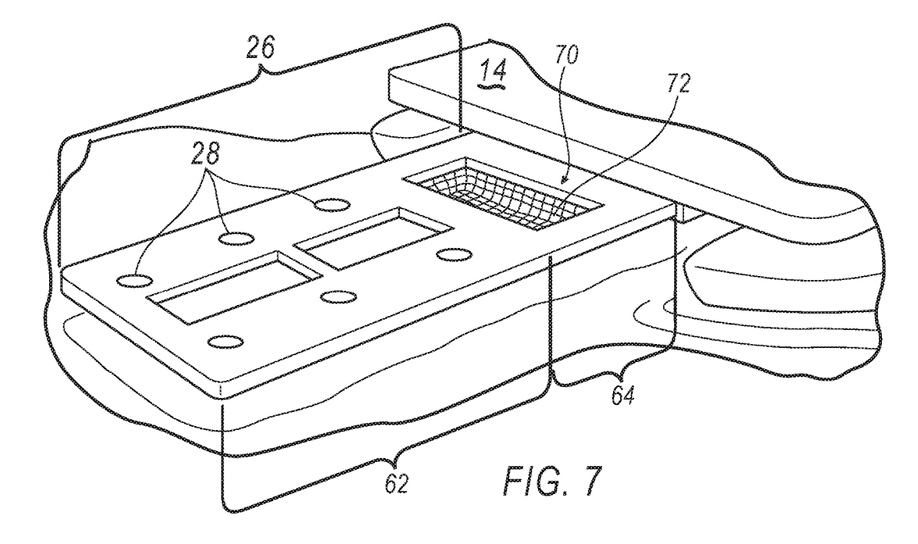
FIG. 7 is an illustration of an alternate exemplary example of a rigid elongated platform for use with the extendable table platform assembly.
Figure 8:
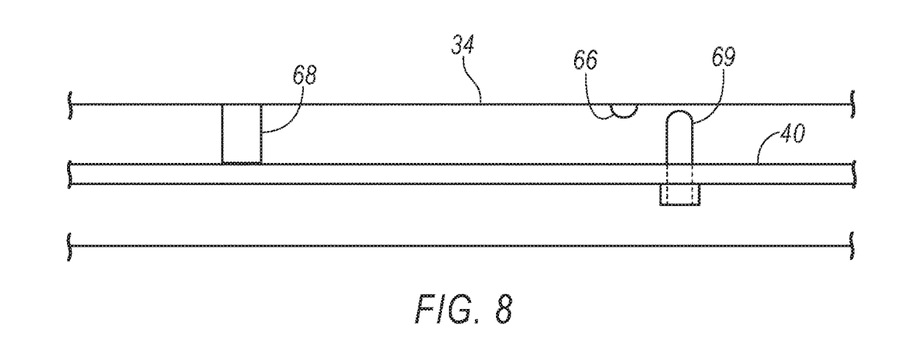
FIG. 8 is a detailed view of an exemplary illustration of a dual stop assembly for use in the extendable table platform assembly illustrated in FIG. 7.

Referring now to FIG. 7, which a detailed illustration of an alternate exemplary illustration of the rigid elongated platform 22. In this example the table portion 26 is comprised of a primary table portion 62 and an auxiliary table portion 64. The primary table portion 62 operates as previously described. The auxiliary table portion 64 may be configured to provide additional utility only when needed. It may therefore be used in conjunction with a dual stop arrangement having a temporary stop 66 and a permanent stop 68 as depicted in FIG. 8. The temporary stop 66 is configured to retain the auxiliary table portion 64 under the deck 14 as the rigid elongated platform 22 is moved towards the deployed position 24. The temporary stop 66 may be overcome through the application of additional force to move a stop pin 69 past the temporary stop 66. The permanent stop 68 is positioned to retain the cantilever portion 32 under the deck 14. The auxiliary table portion 64 may be utilized for temporary usages such as a storage section 70 formed in the upper platform surface 30. In the illustrated exemplary example, the storage section 70 is comprised of a mesh bag 72 wherein picnic items may be stored when not in use. The mesh bag 72 may be tied up when not in use. Alternative storage solutions include, but are not limited to, sealed containers, tub inserts, lock boxes, and food storage containers.

Figures 9, 10:
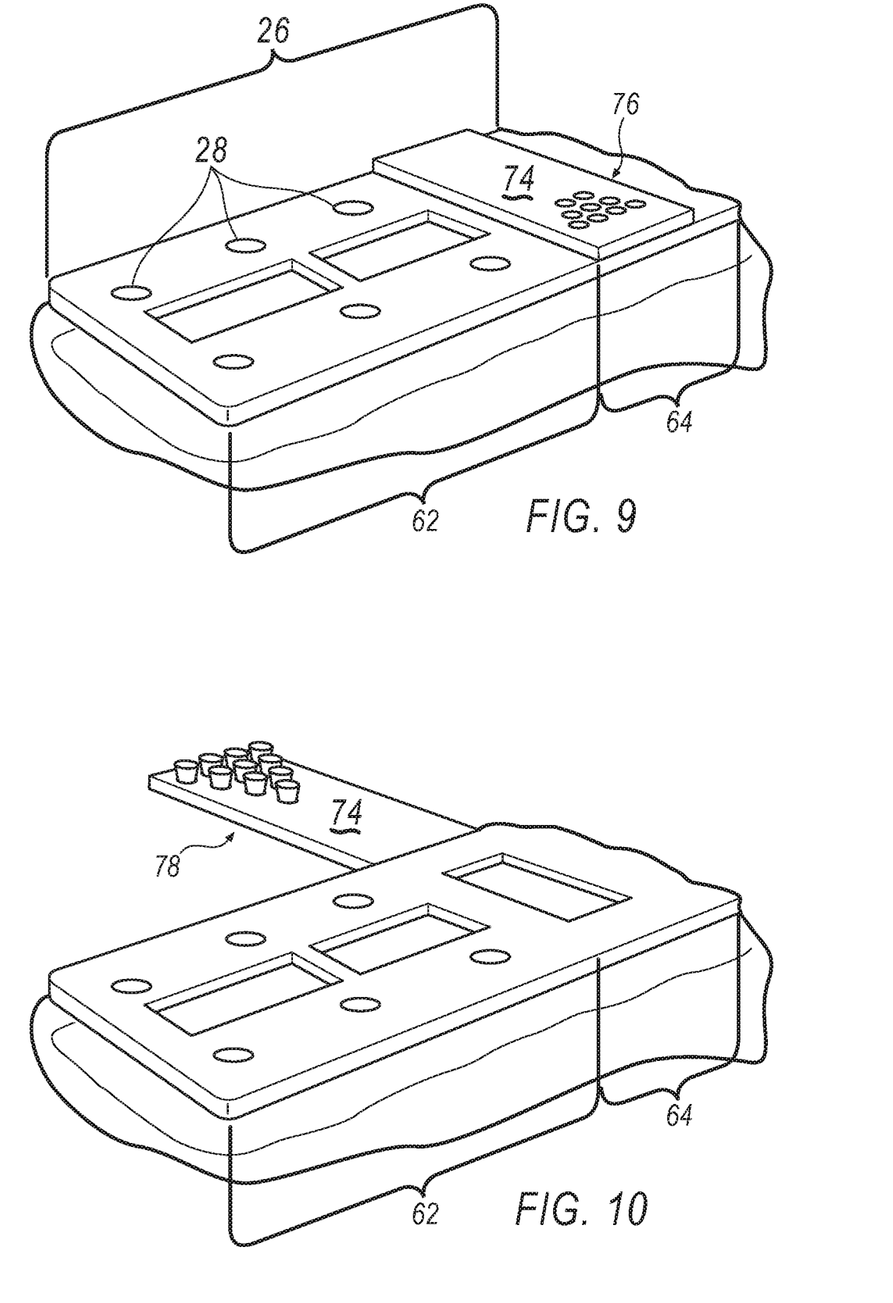
FIG. 9 is an illustration of an alternate exemplary example of the rigid elongated platform illustrating a side extension table in a first position.
FIG. 10 is an illustration of the exemplary example shown in FIG. 9 illustrating a side extension table in a second position.
Figure 11:
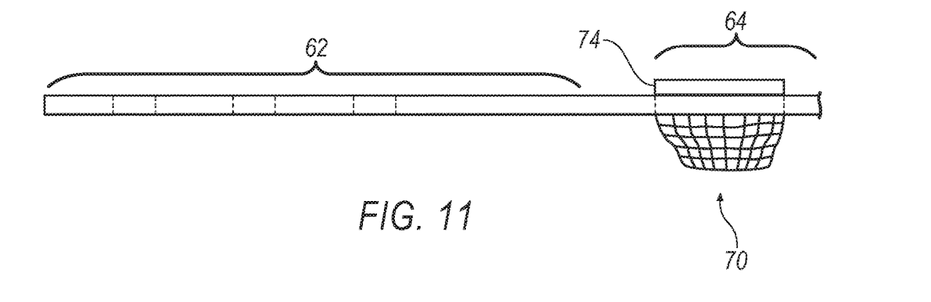
FIG. 11 is an illustration of an exemplary example combining the features illustrated in FIGS. 7 and 9.

Referring now to FIGS. 9 and 10, which are an alternate exemplary illustration of the table portion 26. The table portion 26, and in particular the auxiliary table portion 64 may include a side extension table 74 configured to move between a first position 76 within the platform surface perimeter 44 to a second position 78, see FIG. 10, extending outwards past the platform surface perimeter 44. This may be utilized to increase table space, or to provide game specific entertainment. The side extension table 74 may include its own plurality of recesses 28 to retain items such as glasses. In one exemplary example, the recesses 28 may be positioned to form an arrangement suitable for beer pong. In still another exemplary example, the storage section 70 may be combined with the side extension table 74, as shown in FIG. 11, for increased utility.

Figure 12:
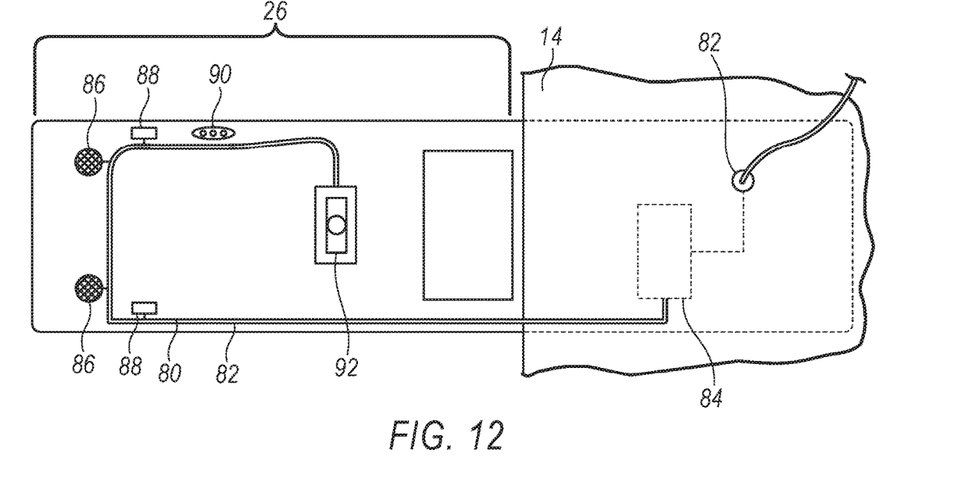
FIG. 12 is an illustration of an alternate exemplary example of the extendable table platform assembly shown in FIGS. 1-4, the alternate exemplary example incorporating electronic features.

Referring not to FIG. 12, which is an illustration of an alternate exemplary example of the extendable table platform assembly 10. An electrical conduit assembly 80 is positioned within the extendable table platform assembly 10 and runs from the cantilever portion 32 to the table portion 26. The electrical conduit assembly 80 may be connected to one of a marine electrical conduit 82 and/or a marine battery 84 mounted within the assembly 10. It is contemplated that the marine electrical conduit 82 may be attached to the electrical system of the boat 12 (not shown) to provide power to the extendable table platform assembly 10. In at least one exemplary example, the marine electrical conduit 82 is contemplated to convey low-voltage dc current. Although the electrical conduit assembly 80 may provide power, it may also include an electrical communications conduit 82 contained within. This provides not only power to the extendable table platform assembly 10, but additionally facilitates remote communications with any systems presently on board the boat 12. The exemplary example may include speakers 86, charging ports 88, remote controls 90, and/or video displays 92 integrated into the extendable table platform assembly 10 and in communication with the electrical communications conduit 82. This allows boaters access to a wide variety of modern entertainment options without having to re-enter the boat 12. The remote controls 90 may also be utilized to control broadcasting features permanently mounted in the boat 12. A variety of additional electrically controlled or powered features would be obvious in light of the present disclosure.

Figure 13:
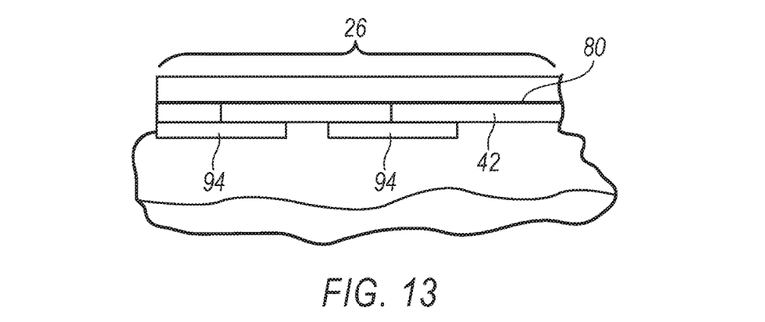
FIG. 13 is an illustration of an exemplary addition to the example shown in FIG. 12, the addition adding solar panels to an electrical conduit.

Referring now to FIG. 13, which is an illustration of another alternate exemplary example of the extendable table platform assembly 10 that may be used in conjunction with the example shown in FIG. 12. The example contemplates one or more solar panels 94 mounted on the lower platform surface 42. The solar panels 94 are in communication with the electrical conduit assembly 80 and may provide power to accessories either directly or in conjunction with the marine battery 84. The advantage of mounting solar panels 94 on the lower platform surface 42 is that they do not detract from aesthetics or usable surface area on the upper platform surface 30. The solar panels 94 remain effective due to the high rate of solar reflection of the water's surface. Therefore, they maintain the charging advantages without the negative surface requirements.

Accordingly, it is to be understood that the above description is intended to be illustrative and not restrictive. Many embodiments and applications other than the examples provided would be apparent upon reading the above description. For example, the electrical conduit assembly 80 could be utilized to power or communicate with a wide variety of products that would be clear in light of the present disclosure. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An extendable table platform assembly for use with a multihull boat having a horizontal deck supported on either side by floatation elements, the horizontal deck having a bow portion and a stern portion, the extendable platform comprising:
   a pair of opposing guide channels configured to be mountable on an underside of the horizontal deck;
   a rigid elongated platform comprising a platform surface having an upper platform surface and a lower platform surface and a platform surface perimeter, the platform surface is supported by a structural platform frame positioned along the platform surface perimeter, the rigid elongated platform including a table portion and a cantilever portion;

wherein the structural platform frame is positioned within the pair of opposing guide channels such that the rigid elongated platform may be manually slid from a stowed position to a deployed position;

wherein the table portion is configured to extend outward from the bow of the horizontal deck and the cantilever portion remains engaged to the opposing guide channels to support the table portion in the deployed position;

wherein the table portion and the cantilever portion are configured to be positioned under the horizontal deck in the stowed position; and wherein the table portion includes a plurality of recesses formed in the upper platform surface and configured to retain tableware items;

wherein the table portion is comprised of a primary table portion and an auxiliary table portion;

wherein the rigid elongated platform includes a temporary stop element retaining the auxiliary table portion under the horizontal deck as the rigid elongated platform is moved towards the deployed position, the temporary stop element configured to generate a frictional engagement between the rigid elongated platform and the pair of opposing guide channels to allow the entire table portion to be moved into the deployed position with additional force; and wherein the rigid elongated platform includes a permanent stop element configured to generate interference between the rigid elongated platform and the pair of opposing guide channels to prevent the cantilever portion from extending past the bow of the horizontal deck.

2. The extendable table platform assembly as described in claim 1, wherein the auxiliary table portion includes a side extension table configured to move between a first position within the platform surface perimeter and a second position extending outwards past the platform surface perimeter.

3. The extendable table platform assembly as described in claim 2, wherein the auxiliary table portion includes a storage section formed in the platform surface, the storage section positioned beneath the side extension table.

4. The extendable table platform assembly as described in claim 1, wherein the auxiliary table portion includes a storage section formed in the platform surface.

5. The extendable table platform assembly as described in claim 1, wherein the structural platform frame includes a perimeter rim section extending above the upper platform surface.

6. The extendable table platform assembly as described in claim 1, wherein the rigid elongated platform further comprises an electrical conduit assembly extending from the cantilever portion to the table portion and at least one of a marine electrical port and a battery.

7. The extendable table platform assembly as described in claim 6, wherein the electrical conduit assembly includes one or more solar panels positioned on the lower platform surface.

8. The extendable table platform assembly as described in claim 6, wherein the platform surface includes one or more speakers, charging ports, displays, and remote controls.

9. The extendable table platform assembly as described in claim 6, wherein the electrical conduit assembly includes an electrical communication conduit configured to provide communication with the multihull boat.

10. The extendable table platform assembly as described in claim 1, wherein the rigid elongated platform includes one or more lighting elements.

11. The extendable table platform assembly as described in claim 1, wherein the platform surface comprising one of a lightweight polymer material and a thin aluminum mesh.

12. The extendable table platform assembly as described in claim 1, wherein the platform surface includes one or more lighting features integrated into the upper platform surface.

13. The extendable table platform assembly as described in claim 1, wherein the platform surface includes one or more solar panels affixed on the lower platform surface.

14. A method of adding an extendable table platform to a multihull boat having a horizontal deck supported on either side by floatation elements the horizontal deck having a bow portion and a stern portion, comprising:

mounting a pair of opposing guide channels to an underside of the horizontal deck;

positioning a rigid elongated platform between the pair of opposing guide channels such that the pair of opposing guide channels slidably retains the rigid elongated platform, the rigid elongated platform comprising a platform surface having an upper platform surface and a lower platform surface and a platform surface perimeter, wherein the platform surface perimeter is supported by a structural platform frame and the rigid elongated platform includes a table portion and a cantilever portion, the table portion having a plurality of recesses configured to retain tableware items;

configuring the rigid elongated platform to move between a stowed position and a deployed position;

wherein the table portion extends outward from the bow of the horizontal deck and the cantilever portion remains underneath the horizontal deck and engaged to the opposing guide channels to support the table portion in the deployed position;

wherein the table portion and the cantilever portion are positioned under the horizontal deck in the stowed position;

wherein the table portion is comprised of a primary table portion and an auxiliary table portion;

wherein the rigid elongated platform includes a temporary stop element retaining the auxiliary table portion under the horizontal deck as the rigid elongated platform is moved towards the deployed position, the temporary stop element configured to generate a frictional engagement between the rigid elongated platform and the pair of opposing guide channels to allow the entire table portion to be moved into the deployed position with additional force; and wherein the rigid elongated platform includes a permanent stop element configured to generate interference between the rigid elongated platform and the pair of opposing guide channels to prevent the cantilever portion from extending past the bow of the horizontal deck.

15. A method as described in claim 14, further comprising:

configuring one or more of the plurality of recesses as cut-through recesses to allow portions of table ware items to extend below the lower platform surface.

* * * * *